Sept. 27, 1932. L. H. THOEN 1,879,960
COMBINED HARVESTER-THRESHER
Filed April 29, 1931 2 Sheets-Sheet 2
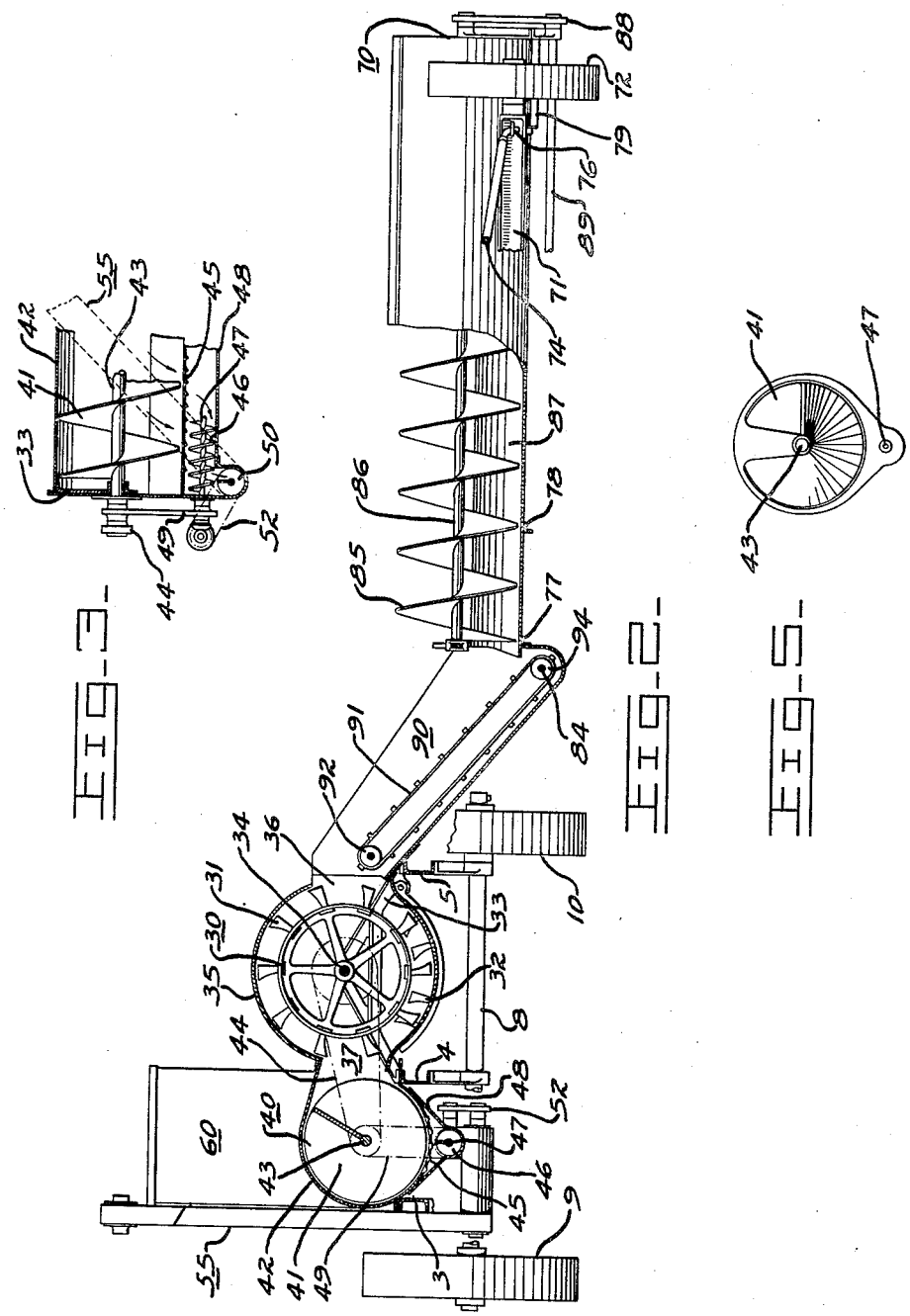
INVENTOR.
LOWELL H. THOEN
BY
ATTORNEYS.

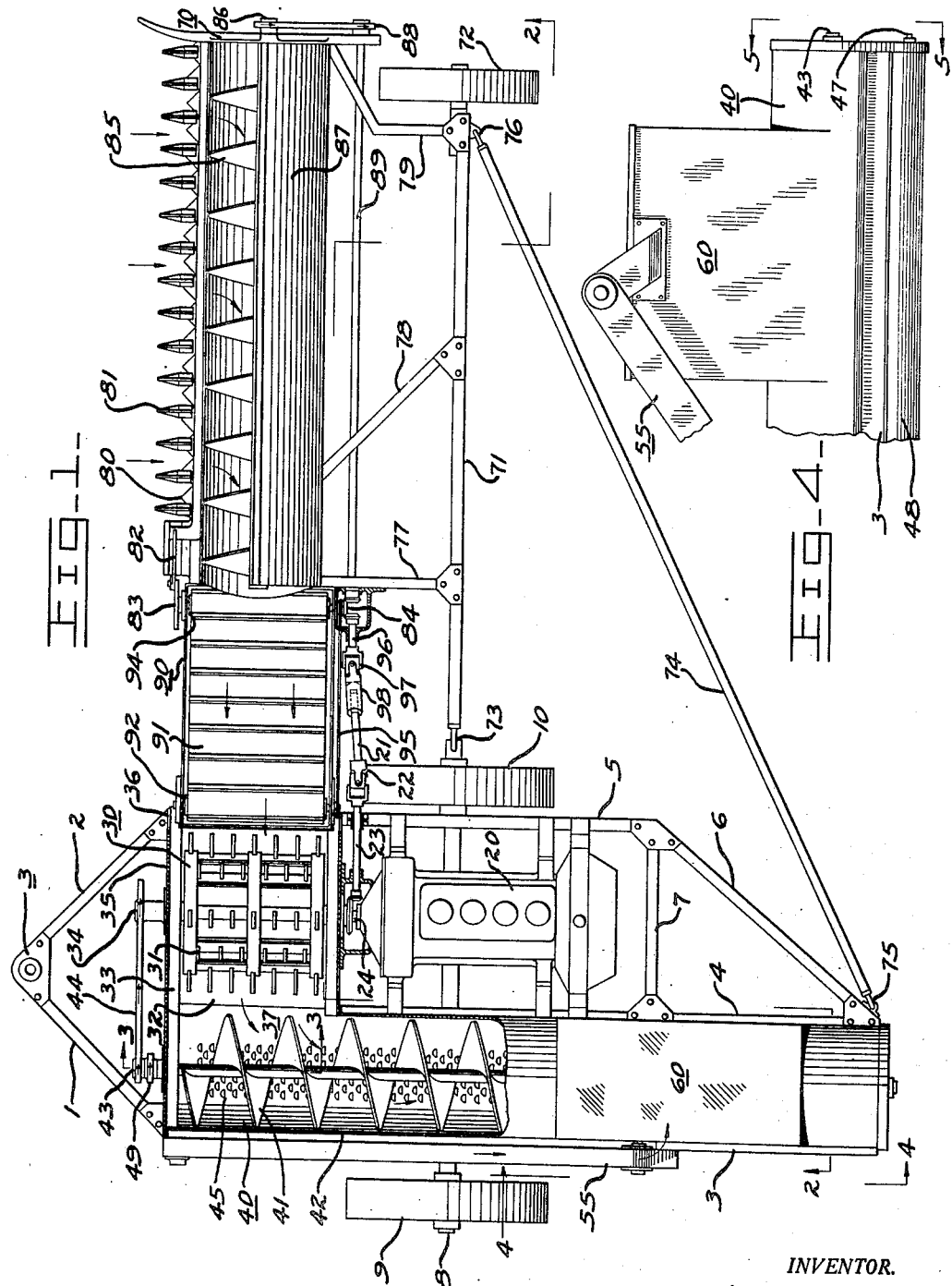

Patented Sept. 27, 1932

1,879,960

UNITED STATES PATENT OFFICE

LOWELL H. THOEN, OF SAN LEANDRO, CALIFORNIA, ASSIGNOR TO CATERPILLAR TRACTOR CO., OF SAN LEANDRO, CALIFORNIA, A CORPORATION OF CALIFORNIA

COMBINED HARVESTER-THRESHER

Application filed April 29, 1931. Serial No. 533,676.

This invention relates to combined harvester-threshers. The object of the invention is to provide an improved arrangement of the header, threshing and separating mechanisms in a combined harvester-thresher.

Description of figures

Fig. 1 is a plan view of the machine with parts broken away.

Fig. 2 is a sectional view on line 2—2 of Fig. 1.

Fig. 3 is a sectional view of the front end of the separator on line 3—3 of Fig. 1.

Fig. 4 is a left side elevation of the rear end of the separator on line 4—4 of Fig. 1.

Fig. 5 is an end view of the separator on line 5—5 of Fig. 4.

Description of machine

The frame of the machine consists of two forwardly converging frame members 1, 2, which are joined to a draft attachment 3. The other ends of the frame members 1, 2 are connected to the forward ends of frame members 3, 5, respectively. Central longitudinal frame member 4 is arranged parallel to side frames 3, 5, and is suitably connected thereto by cross members, including members 6 and 7. The machine is substantially balanced on axle 8 which is provided with wheels 9 and 10.

Motor 20 is mounted on frame members, 4, 5 of axle 8 with the center line of the motor parallel to the longitudinal center line of the machine. Threshing mechanism 30 is arranged forward of the motor and in line therewith. Separator 40 is arranged along the left side of the main frame, and is supported on frame members 3, 4 with its axis parallel to the center line of the motor and the threshing mechanism. Grain bin 60 is mounted on the rear end of separator 40. Header unit 70 is disposed at the right side of the machine, and is adapted to cut the grain and feed the cut grain to the threshing mechanism.

The header unit is mounted on axle 71, the outer end of which is provided with wheel 72, the inner end of which has universal connection 73 to main axle 8. Push pole 74 is connected at 75 to the rear end of the main frame, and at 76 to header axle 71. By these connections, the header unit is propelled with the machine and is maintained in position but is permitted to rise and fall in case there are irregularities in the ground. The header supporting framework includes members 77, 78, 79, which extend forwardly from axle 71. Sickle bar 80 is mounted at the leading edge of the header and is adapted to be reciprocated in sickle guards 81. Sickle bar 80 is reciprocated by pitman 82 from crank 83 on shaft 84. The grain when cut falls into auger conveyor 85 mounted on shaft 86 in housing 87. Shaft 86 is driven by chain 88 from shaft 89. The grain is discharged from the auger into spout 90 in which is draper 91 on rollers 92, 94. The conveyor carries the grain up the spout into the thresing mechanism. Roller 94 is loose on shaft 84 and the shaft in roller 92 is driven by chain 95 from shaft 84. Shafts 84 and 89 are driven by shaft 96 which is connected by universal joint 97 to hollow square sleeve 98 which is adapted to be telescopically engaged with square shaft 21 which is connected by universal joint 22 to shaft 23 on the main frame which is driven from motor shaft 24.

The threshing mechanism 30 consists of a cylinder 31 and a concave 32 supported in sub-frame 33 mounted on the main frame. Cylinder shaft 34 is directly connected to motor shaft 24. The cylinder is enclosed by housing 35 which has opening 36 to receive grain from the spout, and opening 37 to discharge grain into the separator.

Separator unit 40 consists of auger 41 mounted in housing 42 on shaft 43, which is driven by chain 44 from cylinder shaft 34. The bottom of housing 42 is perforated at 45 to permit grain kernels to drop into auger 46. Auger 46 is enclosed by housing 48 secured to housing 42, and is mounted on shaft 47 which is driven by chain 49 from shaft 43. Straw is discharged from the open rear end of the separator housing illustrated in Fig. 5, and the grain kernels which collect in housing 48 are carried forwardly by auger 46 to a cross auger 50 which deposits them in a conveyor 55 which conveys them to bin 60.

Auger 50 and elevator 55 are operated by chain 52 from shaft 47.

I, therefore, claim as my invention:

1. In a combined harvester-thresher, a frame, a cylinder and concave unit, and a separating unit for receiving all the material from said first-mentioned unit and mounted on said frame, the axes of said units being arranged parallel to the longitudinal axis of said frame.

2. In a combined harvester-thresher, a frame, a cylinder and concave unit, a separator unit for receiving all the material from said first-mentioned unit, a motor operatively connected to said units, and means to support said units and said motor on said frame with the axes of said units and said motor parallel to the longitudinal axis of said frame.

3. In a combined harvester-thresher, a frame, a wheeled axle support therefor, a cylinder and concave unit, a separator unit for receiving all the material from said first-mentioned unit, a motor, operative connections between said motor and said units, and means to support said units and said motor on said frame, the axes of said units and said motor being arranged parallel to the longitudinal axis of the machine, and the combined weight of said motor, said units and said frame being substantially balanced on said axle.

4. In a combined harvester-thresher, a threshing machine having a cylinder and concave unit, and a separator unit arranged with the axes of said units parallel, and a header unit connected to said machine, having a spout arranged in alignment with said cylinder and concave unit and adapted to discharge directly therein.

5. In a combined harvester-thresher, a threshing machine, including rotary threshing and separating mechanisms having parallel axes of rotation, and a header unit connected to said threshing machine having a rotary conveyor, the axis of rotation of said conveyor being arranged substantially normal to the axis of rotation of said threshing mechanism.

6. In a combined harvester-thresher, a header unit having means for conveying grain stalks, a thresher unit positioned to receive the stalks from the header unit, and a separator unit for receiving both threshed grain and straw from the thresher unit and having means for moving these materials along a substantially straight line while effecting separation therebetween, the separator unit being arranged to move material in a direction transverse to the direction of movement through the thresher unit.

7. In a combined harvester-thresher, a header unit having means for conveying grain stalks, a thresher unit positioned to receive the stalks from the header unit, and a separator unit for receiving both threshed grain and straw from the thresher unit and having means for moving these materials along a substantially straight line while effecting separation therebetween, the thresher unit and the separator unit being arranged to move the material in an L-shaped path.

8. In a combined harvester-thresher, a thresher unit within a housing, and a separator unit within a housing, said housings being in direct communication so that all the material from the thresher unit is passed directly into the separator unit, and the separator unit and its housing being positioned to change the direction of movement of material from the thresher unit.

9. In a combined harvester-thresher, a thresher unit within a housing, and a separator unit within a housing, said housings being in direct communication so that all the material from the thresher unit is passed solely thereby directly into the separator unit, and the separator unit and its housing being positioned to move material at right angles to the direction of movement through the thresher housing.

10. In a combined harvester-thresher, a thresher unit within a housing, a header unit including a spout communicating with said housing at one side thereof, means for conveying material along said spout into the housing, and a separator unit within a housing positioned at the opposite side of the first housing, said housings being in direct communication so that all the material from the thresher unit is passed directly into the separator unit, and the separator unit and its housing being positioned to move material at right angles to the direction of movement through the thresher housing.

11. In a combined harvester-thresher, a header unit having means for conveying grain stalks, a thresher unit positioned to receive the stalks from the header unit, and a separator unit for receiving threshed grain and straw from the thresher unit and including a plurality of conveyors one for the separated threshed grain, the separator unit including its threshed grain conveyor being arranged to move the material along a straight line path transverse to the direction of movement through the thresher unit.

In testimony whereof, I have hereunto set my hand.

LOWELL H. THOEN.